United States Patent
Avrahami (10) Patent No.: US 9,083,768 B2
(45) Date of Patent: Jul. 14, 2015

(54) CONTENT SHARING DEVICE MANAGEMENT

(71) Applicant: INTEL CORPORATION, Santa Clara, CA (US)

(72) Inventor: Daniel Avrahami, Moutain View, CA (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 13/995,115

(22) PCT Filed: Mar. 12, 2013

(86) PCT No.: PCT/US2013/030601
§ 371 (c)(1),
(2) Date: Jun. 17, 2013

(87) PCT Pub. No.: WO2014/142814
PCT Pub. Date: Sep. 18, 2014

(65) Prior Publication Data
US 2014/0282102 A1 Sep. 18, 2014

(51) Int. Cl.
*G06F 3/0481* (2013.01)
*H04L 29/06* (2006.01)

(52) U.S. Cl.
CPC .......... *H04L 65/403* (2013.01); *H04L 65/1093* (2013.01)

(58) Field of Classification Search
CPC .................................................... G06F 3/0481
USPC ......................................................... 715/753
See application file for complete search history.

(56) References Cited

U.S. PATENT DOCUMENTS

| 7,966,565 | B2* | 6/2011 | Dawson et al. ............... 715/751 |
| 8,307,046 | B2* | 11/2012 | Ortiz et al. .................... 709/217 |
| 2006/0023063 | A1* | 2/2006 | Okawa ........................ 348/14.09 |
| 2008/0034037 | A1* | 2/2008 | Ciudad et al. ................. 709/204 |
| 2008/0034038 | A1* | 2/2008 | Ciudad et al. ................. 709/204 |
| 2008/0109852 | A1* | 5/2008 | Kretz et al. ..................... 725/62 |
| 2008/0229202 | A1* | 9/2008 | Fang et al. .................... 715/716 |
| 2012/0066351 | A1* | 3/2012 | Choi et al. .................... 709/219 |

(Continued)

FOREIGN PATENT DOCUMENTS

KR 1020100062866 A 6/2010
KR 1020110020453 A 3/2011

OTHER PUBLICATIONS

International Search Report and Written Opinion mailed Dec. 2, 2013 for International Application No. PCT/US2013/030601, 12 pages.

*Primary Examiner* — Reza Nabi
(74) *Attorney, Agent, or Firm* — Schwabe, Williamson & Wyatt, P.C.

(57) ABSTRACT

Computer-readable storage medium, apparatus and method associated with sharing content between users of a computing environment are disclosed herein. In embodiments, one or more computer-readable storage media may contain instructions which when executed by a computing device may facilitate a first user of the computing environment in selecting at least one of a plurality of devices associated with a second user of the computing environment on which to share content with the second user. In some embodiments this may be accomplished through the use of a content sharing device management service of the computing environment. Other embodiments may be described and/or claimed.

20 Claims, 5 Drawing Sheets

(56) References Cited

U.S. PATENT DOCUMENTS

| | | | |
|---|---|---|---|
| 2012/0151015 A1* | 6/2012 | Plastina et al. | 709/219 |
| 2012/0262532 A1* | 10/2012 | Poon | 348/14.02 |
| 2013/0028132 A1* | 1/2013 | Choi | 370/254 |
| 2013/0055330 A1* | 2/2013 | Igoe | 725/114 |
| 2013/0097516 A1* | 4/2013 | Hong et al. | 715/739 |
| 2013/0111039 A1* | 5/2013 | Gomes | 709/227 |
| 2014/0278438 A1* | 9/2014 | Hart et al. | 704/275 |
| 2014/0282102 A1* | 9/2014 | Avrahami | 715/753 |

* cited by examiner

CONTENT SHARING DEVICE MANAGEMENT

CROSS REFERENCE TO RELATED APPLICATIONS

The present application is a national phase entry under 35 U.S.C. §371 of International Application No. PCT/US2013/030601, filed Mar. 12, 2013, entitled "CONTENT SHARING DEVICE MANAGEMENT", which designated, among the various States, the United States of America. The Specification of the PCT/US2013/030601 Application is hereby incorporated by reference.

TECHNICAL FIELD

Embodiments of the present disclosure are related to the field of data processing, and in particular, to the field of device management when sharing content.

BACKGROUND

When individuals interact face-to-face there is a certain amount of control each individual sharing information has over the medium and mode of sharing. For example, if one individual wants to share a video, that individual may elect to share the video on their tablet, smart phone, or a laptop. In contrast when interacting with a remote user over the internet, under the current state of art, the user sharing the information may not have control over the device on which the receiver receives the shared content.

DETAILED DESCRIPTION OF ILLUSTRATIVE EMBODIMENTS

Computing devices associated with content sharing between remote users are described herein, among other embodiments. In embodiments, the computing devices may comprise a communication module and a content sharing module coupled to the communication module. The content sharing module may be configured to enable a first user of the computing environment, to select one or more devices, from a group of two or more devices associated with a second user, of the computing environment on which to share content with the second user. In some embodiments, this may be accomplished through a content sharing device management service. For example, the device associated with a second user may be a smartphone, tablet or laptop, the shared content may be graphical content such as an image or video and the content sharing device management service may be a web application.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
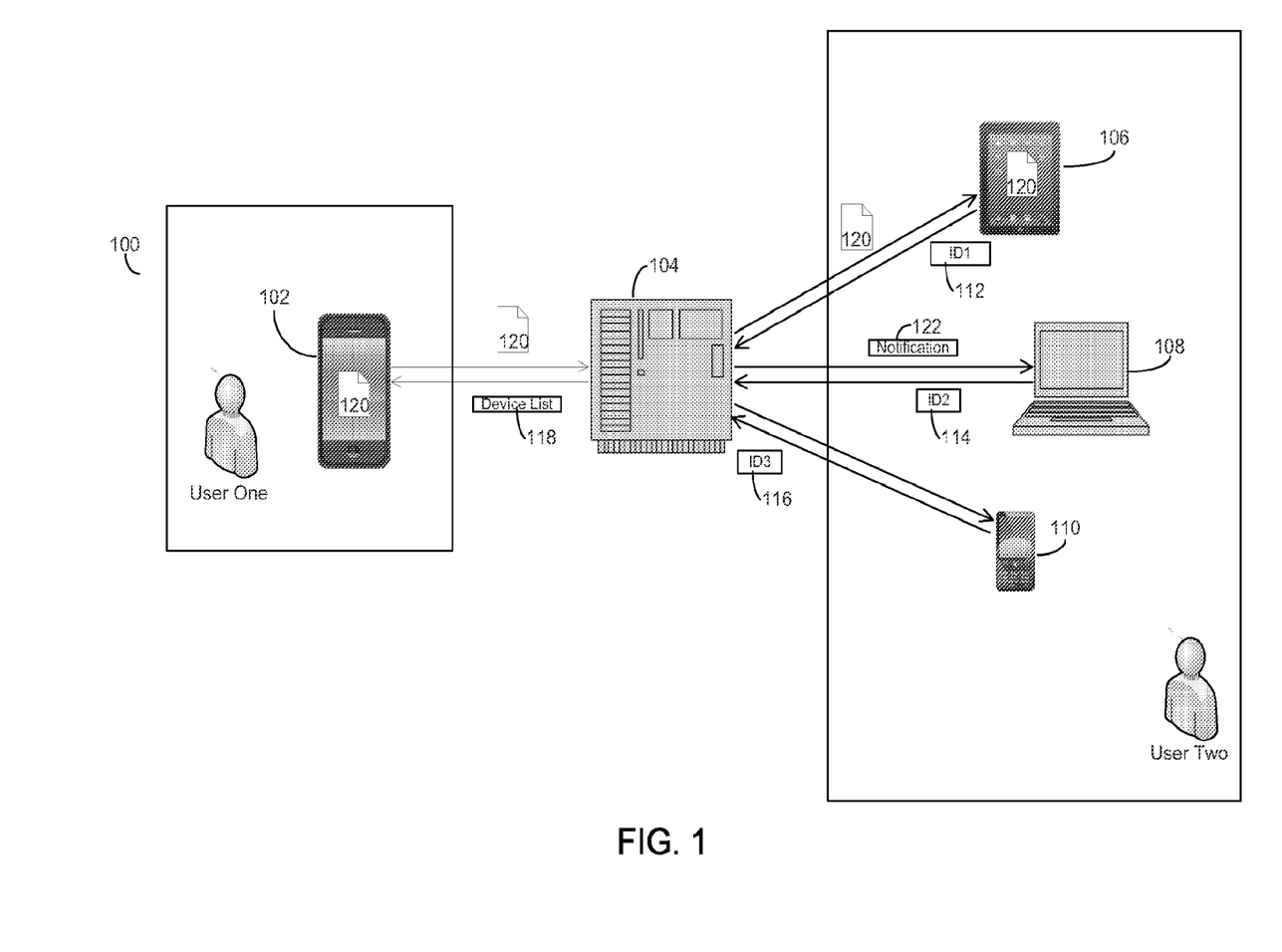
FIG. 1 depicts an illustrative computing environment with an intermediate server, according to some embodiments of the present disclosure.

FIG. 1 depicts an illustrative computing environment 100, according to some embodiments of the present disclosure. As illustrated, computing environment 100 may be comprised of two or more groups of computing devices. One group of computing devices may be associated with User One, such as smartphone 102. The second group of computing devices may be associated with User Two, such as tablet 106, laptop 108, and smartphone 110. The association of these computing devices with the respective user is discussed in greater detail in reference to FIG. 3, below.

In some embodiments, the groups of computing devices may be connected to intermediate server 104 having a content sharing device management service, hereinafter "the Service," via one or more networks. The Service, in some embodiments, may be an internet or intranet application that the users of the computing environment may have connected the computing devices to. In some embodiments, the computing devices may be connected to the Service via a web browser by entering a uniform resource locator (URL) or an internet protocol (IP) address associated with the Service into the web browser. In other embodiments, the computing devices may be connected to the Service through an application, such as a plug-in or stand-alone application, executing on the computing device. The Service may act to distribute content and communications between the computing devices of the connected users. In addition, the Service, in some instances, may act to aggregate identifiers of the devices associated with each user of the computing environment. For example, as depicted here, tablet 106 may transmit a unique identifier 112 to intermediate server 104. This unique identifier may be aggregated into a device list by the Service with the unique identifiers 114 and 116 transmitted by laptop 108 and smartphone 110, respectively. The unique identifier may be anything that may be used to uniquely identify the associated computing device and is further discussed in reference to FIG. 3, below.

In some embodiments, the aggregation of the computing devices into a device list associated with User Two may be used to enable User One to select a specific device on which to share content with User Two. For example, User One may request to share content 120 with User Two through the Service. In response to this request, the Service may provide User One with device list 118. In other embodiments, the Service may provide the device list to User One prior to making the request, such as, for example, when User One first established a connection with the Service. Where the device list may be provided to User One prior to a request to share content, it may be necessary for the Service to periodically provide an updated device list in the event User Two either connects or disconnects a device from the Service. User One may select a device from device list 118 on which to share content 120 with User Two. For example, User One may choose tablet 106 from the device list. The identifier of the selected device along with content 120 may be transmitted to intermediate server where the Service may route the content to the selected device as depicted in FIG. 1. This is depicted by the movement of content 120 through computing environment 100.

In some embodiments, one of the computing devices associated with User Two may be designated as a primary device, such as laptop computer 108. The primary device may, in some instances, receive a notification 122 from the Service whenever content may be sent to a device other than the primary device. In some embodiments, notification 122 may be sent from the Service contemporaneously with content 120. In other embodiments, notification 122 may be sent prior to transmission of content 120. In some embodiments, notification 122 may offer User Two the option of redirecting content 120 to another device. For example, if the user does not have ready access to tablet 106, User Two may elect to redirect the content to a device more readily accessible. In some embodiments, more than one primary device may be designated by the user. In these embodiments, all such devices may receive notification 122.

In some embodiments, only those computing devices associated with User Two within a certain proximity of a primary device associated with User Two may be aggregated into the device list. This may be accomplished through any colocation mechanism such as, but not limited to, limiting the device list to those devices connected to the same local area network as a primary device and/or by utilizing a global positioning system (GPS) locator of the computing devices to limit the devices to those within a certain distance of a primary device.

While two users are depicted in FIG. 1, it will be appreciated that any number of users could be included in computing environment 100. In instances where more than two users may be connected to intermediate server 104 it will also be appreciated that a single user may share content with more than one user and may select a specific device associated with each user on which to share the content via the procedure described above.

While specific computing devices are depicted as being associated with User One and User Two, it will be appreciated that any number or variety of computing devices may be associated with a user of computing environment 100. For example, multiple computing devices may be associated with User One and User Two may use the procedures described above for selecting a specific device associated with User One on which to share content with User One.

As referred to herein, a computing device may include, but is not limited to, a desktop or laptop computer, a tablet, a smartphone, a game-console, a kiosk or other publicly accessible terminal, or any other device capable of carrying out the actions as described in this disclosure. Furthermore, as used herein, content may refer to any content sharable in a computing environment, including, but not limited to, audio content, such as an audio clip or song, textual content, such as a document or spreadsheet, graphical content, such as pictures, video, or artwork, or any combination thereof.

While intermediate server 104 is depicted as a single server it will be appreciated that any number or types of intermediate servers may be included without departing from the scope of this disclosure. It will also be appreciated that the communication channels depicted in FIG. 1 may be any type or combination of wired or wireless network, including, but not limited to, local area networks (LANs), wide area networks (WANs), cellular networks, and the internet. Any network suitable for transmitting the requisite data may be used without departing from the scope of this disclosure. It will also be appreciated that a plurality of wired and/or wireless networks may be used without departing from the scope of this disclosure. This disclosure is equally applicable regardless of type and/or composition of the network.

Figure 2:
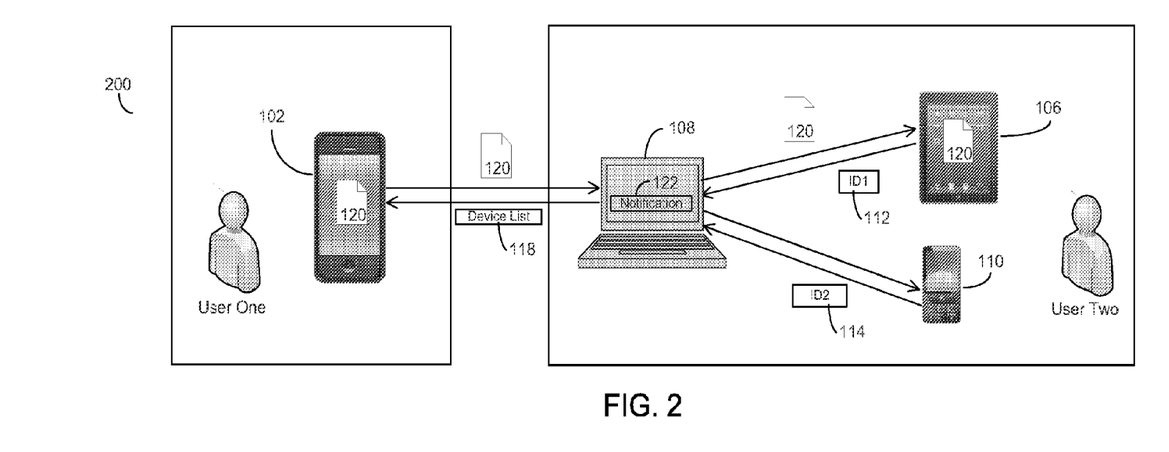
FIG. 2 depicts an illustrative computing environment without an intermediate server, according to some embodiments of the present disclosure.

FIG. 2 depicts an alternative arrangement of the computing environment of FIG. 1. In FIG. 2 the content sharing device management service, hereinafter "the Service," of FIG. 1 may be integrated into laptop 108 associated with User Two. Laptop 108, in some embodiments, may take the place of intermediate server 104. In other embodiments, intermediate server, although not pictured, may still act as an intermediary between the users of the computing environment. In some embodiments, the Service on laptop 108 may act to distribute content and communications between the computing devices of User Two. In addition, the Service, may act to aggregate identifiers of the devices associated with User Two. For example, as depicted here, tablet 106 and smartphone 110 may send unique identifiers 112 and 114, respectively, to the Service on laptop 108. Laptop 108 may then aggregate the unique identifiers and the laptop's own identifier into a device list. In some embodiments, where an intermediate server acts as an intermediary between the users, the Service may send the device list to the intermediate server to be made available to other users of the computing environment. As discussed above in reference to FIG. 1, the unique identifier may be anything that may be used to uniquely identify the associated computing device and is further discussed in reference to FIG. 3, below.

In some embodiments, the device list associated with User Two may be used to enable User One to select a specific device on which to share content with User Two. For example, User One may request to share content 120 with User Two. In response to this request User One may be provided with device list 118. In other embodiments, the device list may be provided to User One prior to making the request, such as, for example, when User One first established a connection with laptop 108, in some embodiments, or an intermediate server in other embodiments. User One may then select a device associated with User Two on which to share content 120, such as, for example, tablet 106. This selection and content 120 may be transmitted to laptop 108 where the Service may route the content to the selected device as depicted in FIG. 1.

In some embodiments, an intermediate server, not pictured, may be used to initially establish a peer-to-peer network between the group of computing devices associated with User One, smartphone 102, and the group of computing devices associated with User Two, 106-110. In some embodiments, this may include establishing a connection between smartphone 102 and laptop 108, depicted here, while laptop 108 may still forward content 120 to the device selected by User One, here represented as tablet 106. In some embodiments, the device list may be aggregated and transmitted by the intermediate server in establishing the peer-to-peer network. In some embodiments the device list may include a network address, such as an IP address, associated with each device in the device list and the peer-to-peer network may be established such that content 120 could be transmitted from any computing device associated with User One directly to any computing device associated with User Two. For example, while not depicted herein, User One would be able to transmit content 120 directly from smartphone 102 to tablet 106 using the network address without going through an Intermediary.

In this arrangement, laptop 108 may be considered a primary device of User Two while tablet 106 and smartphone 110 may be considered secondary devices. In some embodiments, this primary/secondary relationship may be established through a user defined setting, such as that discussed in reference to FIG. 3, below. In other embodiments, the primary/secondary relationship may be established through the use of a primary application, such as the Service, executing on Laptop 108, while a secondary, or helper application, such as a plug-in, executes on tablet 106 and smartphone 110.

In some embodiments, Laptop 108 may display notification 122 whenever content may be sent to a secondary device. In some embodiments, notification 122 may offer User Two the option of redirecting content 120 to another device. For example, if the user does not have ready access to tablet 106, User Two may elect to redirect the content to a device more readily accessible, such as laptop 108. In some embodiments, other primary devices may also be designated by the user. In these embodiments, laptop 108 may send all such devices notification 122.

In some embodiments, only those computing devices associated with User Two within a certain proximity of a primary device associated with User Two may be aggregated into the device list. This may be accomplished through any colocation mechanism such as, but not limited to, limiting the device list to those devices connected to the same local area network as a primary device and/or by utilizing a global positioning system (GPS) locator of the computing devices to limit the devices to those within a certain distance of a primary device.

While two users may be depicted it will be appreciated that any number of users could be included in computing environment 200. In instances where more than two users are included, it will be appreciated that a single user may share content with more than one user and may select a specific device associated with each user on which to share the content via the procedure described above. In some embodiments, all users may be connected to an intermediate server that acts as an intermediary between the connected users.

While specific computing devices are depicted as being associated with User One and User Two, it will be appreciated that any number or variety of computing devices may be associated with a user of computing environment 200. For example, multiple computing devices may be associated with User One and User Two may use the same procedure described above for selecting a specific device associated with User One on which to share content. It will also be appreciated that the communication channels depicted in FIG. 2 may be any type or combination of wired or wireless network, including, but not limited to, local area networks (LANs), wide area networks (WANs), cellular networks, and the internet. Any network suitable for transmitting the requisite data may be used without departing from the scope of this disclosure. It will also be appreciated that a plurality of wired and/or wireless networks may be used in combination without departing from the scope of this disclosure. This disclosure is equally applicable regardless of type and/or composition of the network.

Figure 3:
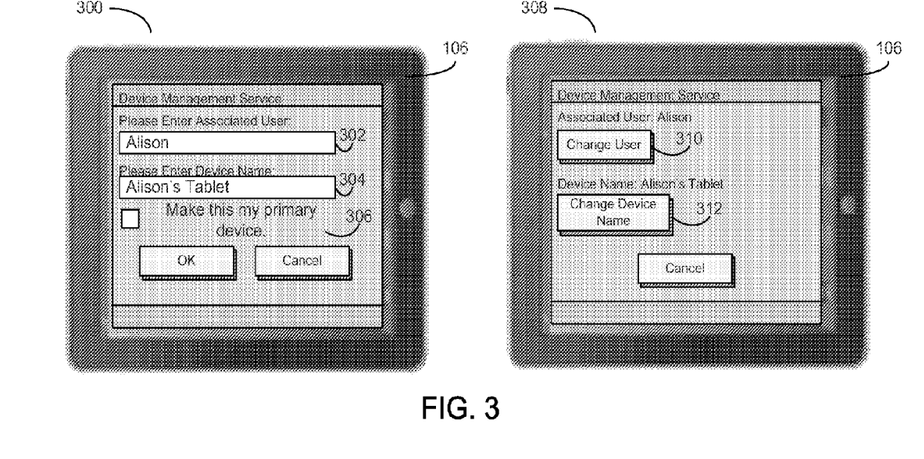
FIG. 3 depicts illustrative screenshots of a device association with a user.

FIG. 3 depicts illustrative screenshots of a user association with a device. Screen 300, in some embodiments, may be a screen provided by an internet or intranet application. In other embodiments, screen 300 may be provided by an application executing on tablet 106. As depicted here, screen 300 may be used to associate tablet 106 with a user. In some embodiments, the user may enter a username into text box 302. The username entered into 302 may act to uniquely identify the user with which to associate the device. While depicted here as a username it will be appreciated that any manner of uniquely identifying a user may be used without departing from the scope of this disclosure. For instance the user may be assigned a unique numerical identifier, such as an employee ID, a user may use an email address or login ID as a unique identifier, or a user may use a biometric identifier, such as a fingerprint or facial recognition, to establish a unique identifier. In some embodiments, the user may also enter a unique identifier for tablet 106 in box 304. As discussed in reference to the username, any manner of uniquely identifying the device may be used without departing from the scope of this disclosure. In some embodiments, the identifier entered for the device may be sufficient to uniquely identify the device in the computing environment and the device identifier may be all that is necessary to be transmitted to the Service of FIG. 1 or FIG. 2. In other embodiments, it may be necessary to concatenate, or consider in conjunction, the unique user ID with the unique device ID to arrive at a device identifier unique to the computing environment as a whole. For example, if there is a multitude of users connected to the Service and a user has merely entered "tablet" as a device name there may be other devices with this same name associated with other users.

While depicted here as textboxes any manner of entering the unique identifiers may be utilized without departing from the scope of this disclosure. For instance, in some embodiments, a dropdown menu may be used instead of a textbox. In these embodiments, the user may be presented with a listing of users that have previously connected with the Service. The user may then select the associated username of the user from the dropdown to associate the device with the user. This may be beneficial in circumstances where the group of users may be small and/or the devices are being used regularly by different users. For example in a business environment where only a small set of users may use the device and/or the device is a device shared by multiple users. In some embodiments, selecting a username may populate a list of device names associated with the selected username. The user may then select the appropriate device from the listed devices and proceed or, alternatively, may be given the opportunity to enter a new unique device. In some embodiments, the listed devices may include only those devices that have been previously associated with the selected user, but are not currently online with the Service. It will be apparent that associating a specific user with a computing device may also involve authentication of the purported user and this may be performed through any authentication mechanism.

In some embodiments, the user may not need to enter a unique user ID and/or a unique device ID to associate the device with the user. In some embodiments, the device may pull the unique user identifier from an application the user has already logged into, for example, an operating system (OS) user ID, a user ID associated with an online service such as Facebook, Skype, or the like. In other embodiments, the user of the device may have a computer-readable medium that may be utilized to associate the device with the user. For instance, the device may have a near field communication (NFC) transceiver built in and the user may use an NFC transmitter, such as an NFC chip, that may provision the device with the unique user ID. This is merely meant as an example, and it will be appreciated that any form of computer-readable medium is contemplated and may be utilized to provision the device with the unique user ID without departing from the scope of this disclosure. In some embodiments, the unique device ID may be pulled from an existing device identifier, for example a computer name on a Windows® PC. In other embodiments the unique device identifier could be generated by the Service, or an ID generator.

As discussed in reference to FIG. 1, the user may be able to designate a device as a primary device utilizing checkbox 306. In some embodiments, when this checkbox is selected it may act to overwrite any previous primary device selection the user had made. In other embodiments, it may act to add the device to a list of primary devices associated with the user.

Screen 308 depicts a screen provided to update or modify the associated unique user ID and/or unique device ID. In this screen, a user may select button 310 to change the associated user, or may select button 312 to change the unique device ID, here referred to as device name. The user may, in some embodiments, select to change one of these entries regardless of how it was initially populated. For instance, the unique user ID may be pulled from the Windows login; however, the login may not be sufficiently descriptive of the user and the user may wish to set it to a more appropriate identifier.

Figure 4:
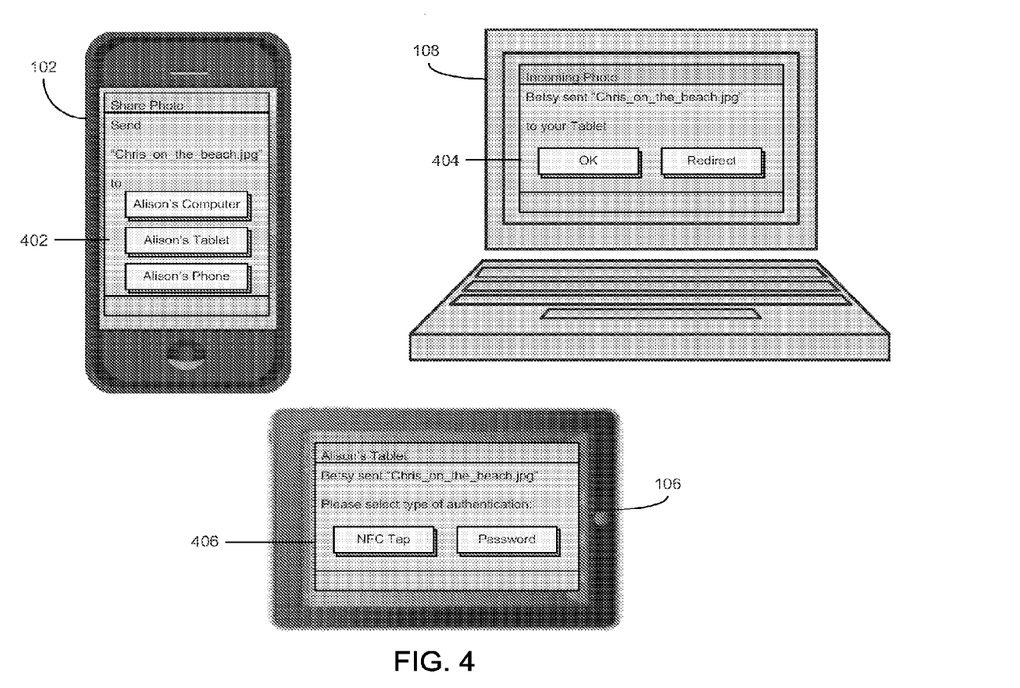
FIG. 4 depicts illustrative screenshots of a sample interaction of a user sharing content with another user, according to some embodiments of the present disclosure.

FIG. 4 depicts illustrative screenshots of the interactions of User One and User Two of FIG. 1 and FIG. 2, represented in FIG. 4 as Betsy and Alison respectively. These screenshots may occur, for example, during a video-conference between two users named Betsy and Alison, where Betsy decides to share content with Alison. In screen 402, Betsy has selected a picture entitled "Chris_on_the_beach.jpg" from her smartphone 102 to share with Allison. In response to the selection a device list associated with Alison may be displayed to Betsy for selection. As depicted here, that device list may include Alison's Computer, Alison's Tablet, and Alison's Phone. In this example, Betsy chooses to send the picture to Alison's Tablet.

In response to the selection by Betsy to share the picture with Alison via Alison's tablet, screen 404 may, in some embodiments, be displayed on a primary device associated with Alison, such as laptop 108. This screen depicts a sample of what notification 122 of FIG. 1 and FIG. 2 may include. Screen 404, as depicted here, may serve two purposes. First, it may be used simply as a notification, for instance Alison may not be looking at her tablet when the picture is shared and therefore Alison may need to be notified that content has been shared with her on her tablet. Second, screen 404 may give Alison the ability to redirect the picture to another device. By clicking the Redirect button of screen 404 Alison may be presented with a list similar to that depicted in screen 402 where Alison could select another device to route the picture to. In some embodiments, the list displayed to Alison may exclude the device previously selected by Betsy. In these embodiments, Alison may be able to select between Alison's Computer and Alison's Phone to redirect the picture to.

Should Alison not choose to redirect the picture, the picture may be automatically displayed on Alison's Tablet 106 and/or it may be saved onto the tablet for future viewing. In some embodiments, it may be desirable to provide a layer of security on the devices to ensure that the shared content is not shared with an unintended user. In these embodiments, the user may be verified through any manner of verification process. As depicted in screen 406, Alison may be given more than one option to authenticate herself. One option may be to enter a password to verify that Alison is the current user of tablet 106. Another option may be to authenticate Alison based upon an NFC tap. In some embodiments, this may be done through an NFC tag where Alison has an NFC card, or the like, that she can tap to the tablet to authenticate her. In some embodiments, the NFC tap may take place between a primary device, where such a device may have been established, and tablet 106. For example, Alison may tap tablet 106 to laptop 108, where laptop 108 has been established as a primary device. In other embodiments, Alison may be authenticated using a biometric authentication mechanism. These are meant to be examples of methods of authentication. It will be appreciated that any manner of authentication may be utilized without departing from the scope of this disclosure.

Figure 5:
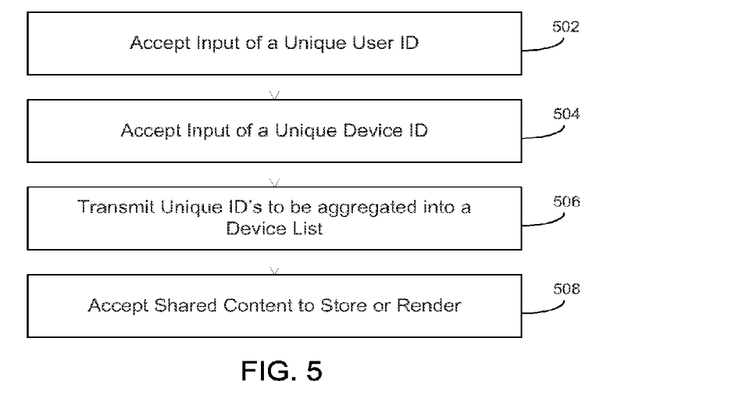
FIG. 5 is a flow chart depicting an illustrative method associated with a device of a computing environment such as that in FIG. 1 and FIG. 2

FIG. 5 is a flow chart depicting an illustrative method associated with a device of a computing environment such as that depicted in FIG. 1 and FIG. 2. The method may begin at block 502 where the device may accept input of a Unique User ID with which to associate the device. At block 504 the device may accept a unique device ID for the associated device. Both the unique user ID and the unique device ID may be persistently stored to a memory of the device. The unique user ID and the unique device ID are discussed in greater detail in reference to FIG. 3, above. At block 506 the unique user ID and the unique device ID may be transmitted to a service, such as, for example, the content sharing device management service discussed above in reference to FIG. 1 and FIG. 2. In block 508 the device may accept content transmitted to it from a first user to be shared with a second user and may store and/or render the content upon receipt. In some embodiments, as discussed above in reference to FIG. 4, a layer of security may be implemented on the device. In these embodiments, although not depicted here, an authentication mechanism may occur prior to block 508.

Figure 6:
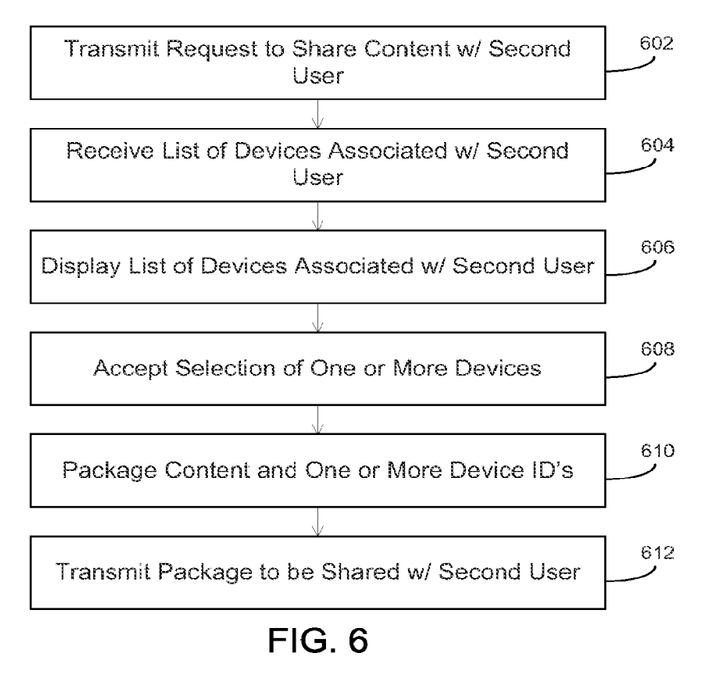
FIG. 6 is a flow chart depicting an illustrative method of allowing a first user to select a device on which to share content with a second user, according to some embodiments of the present disclosure.

FIG. 6 is a flow chart depicting an illustrative method of allowing a first user to select a device on which to share content with a second user, according to some embodiments of the present disclosure. The process may begin at block 602 where a request to share content with a second user may be transmitted to a service, such as the content sharing device management service discussed in reference to FIG. 1 and FIG. 2. In response, a list of devices associated with the second user may be received. As discussed above, the list of devices may be received in response to a request to share content or may be received prior to the request. Where the list of devices is received prior to making the request to share content, the request to share content may not need to be transmitted and the list of devices associated with the second user may just be displayed in response to the request. Once a request to share content has been made and a list of devices associated with the second user has been received, the list of devices may be displayed to the first user for selection by the first user. In block 608 a device selection may be accepted and in block 610 the content to be shared may be packaged together with the one or more identifiers associated with the devices selected by the first user. In block 612, this package may then be transmitted to a service, such as the content sharing device management service discussed in reference to FIG. 1 and FIG. 2 to be distributed to the second user.

Figure 7:
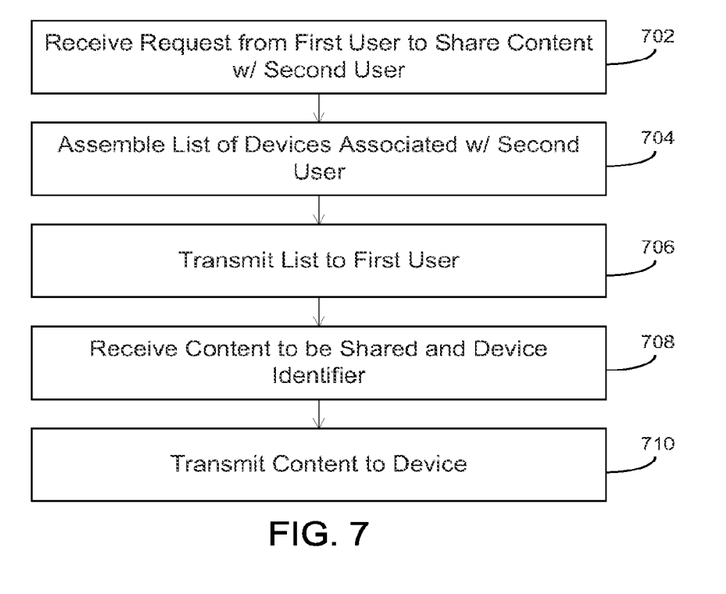
FIG. 7 is a flow chart for an illustrative method associated with a content sharing device management service, according to some embodiments of the present disclosure.

FIG. 7 is a flow chart for an illustrative method associated with a content sharing device management service, according to some embodiments of the present disclosure. The process may begin at block 702 where a request may be received from a first user to share content with a second user. In response to the request, a list of devices associated with the second user is assembled in block 704 and transmitted to the first user in block 706 to enable the first user to select a device on which to share the content with the second user. As discussed previously, the device list may, according to some embodiments, be transmitted to the first user prior to the first user making a request to share content with the second user. In block 708 the content selected by the first user may be received along with an identifier of the device associated with the second user that was selected by the first user. In block 710 the content is transmitted to the device associated with the received device identifier.

Figure 8:
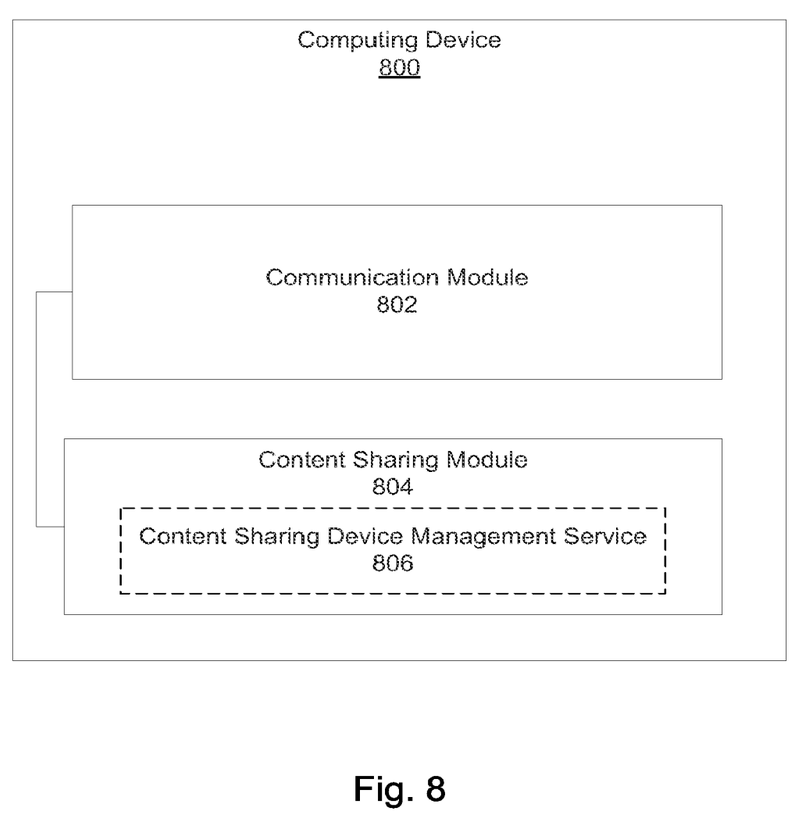
FIG. 8 depicts an illustrative computing device, or apparatus, of computing environment 100 or 200 of FIG. 1 or FIG. 2, respectively, according to some embodiments of the present disclosure.

FIG. 8 depicts an illustrative computing device, or apparatus, of computing environment 100 or 200 of FIG. 1 or FIG. 2, respectively, according to some embodiments of the present disclosure. Computing device 800 may be comprised of a communication module 802 coupled to a content sharing module 804. Content sharing module 804 may, in some embodiments, include content sharing device management service 806.

In some embodiments, content sharing module 804 may comprise one or more processors coupled to one or more computer-readable storage media. The one or more computer-readable storage media may contain instructions which, when executed by the one or more processors, may cause computing device 800 to perform one or more of the processes described in reference to FIG. 5, FIG. 6 or FIG. 7, above. In other embodiments, content sharing module 804 may be composed of any number of hardware and/or software components that may cause computing device 800 to perform one or more processes described in reference to FIG. 5, FIG. 6 or FIG. 7, above. The one or more processors may be any type of single or multi-core processor, or any combination thereof. This disclosure is equally applicable regardless of type and/or number of processors. Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to hardware, software, or a combination of hardware and software.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a USB drive, a random access memory (RAM), a read-only memory (ROM), a rigid magnetic disk and an optical disk. Current examples of optical disks include compact disk—read only memory (CD-ROM), compact disk—read/write (CD-R/W) and DVD.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Example 1 is at least one computer-readable storage medium having instructions stored thereon, wherein the instructions are configured to cause a computing device of a computing environment, in response to execution of the instructions by the computing device, to facilitate a first user of the computing environment in selecting at least one of a plurality of devices associated with a second user of the computing environment on which to share content with the second user, using a content sharing device management service of the computing environment.

Example 2 may include the subject matter of Example 1, wherein the computing device is an intermediate server of the computing environment, configured to provide the content sharing device management service, and wherein the instructions are configured to cause the intermediate server, in response to execution of the instructions by the intermediate server, to assemble a list of devices associated with the second user, and transmit the list of devices to a computing device of the first user to be displayed to the first user for selection of one or more of the listed devices on which to share the content.

Example 3 may include the subject matter of Example 2, wherein the instructions are configured to cause the intermediate server, in response to execution of the instructions by the intermediate server, to facilitate establishment of a peer-to-peer connection between the first and second user.

Example 4 may include the subject matter of Example 2 or 3, wherein the instructions are configured to cause the intermediate server, in response to execution of the instructions by the intermediate server, to receive content to be shared with the second user and a selection of one or more devices from the list of devices associated with the second user, and transmit the content to the one or more devices selected from the list.

Example 5 may include the subject matter of Example 4 wherein the devices associated with the second user include a device designated as a primary device and at least one device designated as a secondary device and wherein to transmit the content to the one or more devices selected from the list further includes transmission of a notification to the primary device indicating the content has been transmitted to the one or more devices selected from the list.

Example 6 may include the subject matter of Example 1, wherein the devices associated with the second user include a device designated as a primary device, and the content sharing device management service is provided by the primary device.

Example 7 may include the subject matter of Example 1, wherein the content sharing device management service is a video-conferencing server of the computing environment, and the content comprises content associated with a video conference between the first and second user, hosted by the video-conferencing server.

Example 8 may include the subject matter of Example 1 wherein the computing device is a client computing device associated with the first user, and wherein the instructions are configured to cause the client computing device, in response to execution of the instructions by the client computing device, to receive, from the content sharing device management service, a list of devices associated with the second user, display the list of devices to the first user, accept input, from the first user, selecting one or more of the listed devices on which to share the content, and provide the content sharing device management service with the selection.

Example 9 may include the subject matter of Example 8 wherein the instructions are further configured to cause the client computing device, in response to execution of the instructions by the client computing device, to package at least the content to be shared, and identification of the selected one or more listed devices into a content sharing package, and transmit the content sharing package to an intermediate server of the computing environment to be transmitted to the selected one or more listed devices to share the content with the second user.

Example 10 may include the subject matter of Example 1 wherein the computing device is a client computing device associated with the second user, and wherein the instructions are configured to cause the client computing device, in response to execution of the instructions by the client computing device, to transmit an identifier of the client computing device to an intermediate server of the computing environment, configured to provide the content sharing device management service, to assemble into a list, devices associated with the second user; and receive content shared by the first user with the second user when the client computing device is selected by the first user as a device for sharing content with the second user.

Example 11 is a computing device of a computing environment for sharing content between a first user and a second user which may include: a communication module configured to transmit and receive data; and a content sharing module, coupled to the communication module, configured to facilitate a first user of the computing environment in selecting at least one of a plurality of devices, associated with a second user of the computing environment, on which to share content with the second user, through a content sharing device management service of the computing environment.

Example 12 may include the subject matter of Example 11, wherein the computing device is an intermediate server of the computing environment and the content sharing module provides the content sharing device management service by being further configured to assemble a list of devices associated with the second user, and transmit the list of devices to a computing device of the first user to be displayed to the first user for selection of one or more of the listed devices on which to share the content.

Example 13 may include the subject matter of Example 12, wherein the content sharing module is further configured to receive content to be shared with the second user and a selection of one or more devices from the list of devices associated with the second user, and transmit the content to the one or more devices selected from the list.

Example 14 may include the subject matter of Example 13, wherein the devices associated with the second user include a device designated as a primary device and at least one device designated as a secondary device and wherein to transmit the content to the one or more devices selected from the list further includes transmission of a notification to the primary device indicating the content has been transmitted to the one or more devices selected from the list.

Example 15 may include the subject matter of any one of Example 12-14, wherein the devices associated with the second user include a device designated as a primary device, and the content sharing device management service is provided by the primary device.

Example 16 may include the subject matter of Example 11, wherein the content sharing device management service is provided by a video-conferencing server of the computing environment and the content is associated with a video conference between the first and second user, hosted by the video-conferencing server.

Examples 17 may include the subject matter of Example 11, wherein the computing device is a client computing device associated with the first user, and the content share module is further configured to receive from the content sharing device management service, a list of devices associated with the second user, display the list of devices to the first user, accept input, from the first user, selecting one or more of the listed devices on which to share the content, and provide the content sharing device management service with the selection.

Example 18 may include the subject matter of Example 17, wherein the content share module is further configured to package at least the content to be shared and identification of the selected one or more listed devices into a content sharing package, and transmit the content sharing package to an intermediate server of the computing environment to be transmitted to the selected one or more listed devices to share the content with the second user.

Example 19 may include the subject matter of Example 11, wherein the computing device is a client computing device associated with the second user, and the content sharing module is further configured to transmit an identifier of the client computing device to an intermediate server of the computing environment, to assemble into a list, devices associated with the second user; and receive content shared by the first user with the second user when the client computing device is selected by the first user as a device for sharing the content with the second user.

Example 20 is a computer-implemented method for sharing content between a first user of a computing environment and a second user of the computing environment including: assembling, by a server of the computing environment, a list of devices associated with the second user; and transmitting, by the server, the list of devices to a computing device of the first user to be displayed to the first user for selection of one or more of the listed devices on which to share the content.

Example 21 may include the subject matter of Example 20, further including: receiving, by the server, content to be shared with the second user and a selection of one or more devices from the list of devices associated with the second user; and transmitting, by the server, the content to the one or more devices selected from the list.

Example 22 may include the subject matter of Example 20 or 21, wherein the list of devices includes network addresses associated with the devices to be used by the computing device of the first user to establish a peer-to-peer network between the computing device of the first user and the devices associated with the second user.

Example 23 may include the subject matter of Example 21, wherein the devices associated with the second user include a device designated as a primary device and at least one device designated as a secondary device and wherein transmitting the content to the one or more devices selected from the list further comprises transmitting a notification to the primary device indicating the content has been transmitted to the one or more devices selected from the list.

Example 24 may include the subject matter of Example 23, wherein the server is the primary device associated with the second user.

Example 25 is a computer-implemented method for sharing content between a first user of a computing environment and a second user of the computing environment including: receiving, by a client computing device associated with the first user, a list of devices associated with the second user; displaying, by the client computing device, the list of devices to the first user; accepting, by the client computing device, input, from the first user, selecting one or more of the listed devices on which to share the content with the second user; and providing, by the client computing device, the content sharing device management service with the selection.

Example 26 may include the subject matter of Example 25, further comprising: packaging, by the client computing device, at least the content to be shared and identification of the selected one or more listed devices into a content sharing package; and transmitting, by the client computing device, the content sharing package to an intermediate server of the computing environment to be transmitted to the selected one or more listed devices to share the content with the second user.

Example 27 is a computing apparatus for sharing content between a first user of a computing environment and a second user of the computing environment including means for performing the operations of the method of any of Examples 20-26.

Example 28 is a computer-readable storage medium including instructions, which, when executed by a computing device, cause the computing device to perform the method of any one of Examples 20-26.

Example 29 is a computing device comprising means for performing the computer-implemented method of any one of Examples 20-26.

What is claimed is:

1. At least one non-transitory computer-readable storage medium having instructions stored thereon, wherein the instructions are configured to cause a computing device, in response to execution of the instructions by the computing device, to facilitate a first user in selecting at least one of a plurality of devices associated with a second user on which to share content with the second user, using a content sharing device management service, wherein the computing device is a client computing device associated with the first user, and in response to execution of the instructions by the client computing device the instructions are configured to cause the client computing device to:

receive, from the content sharing device management service, a list of devices associated with the second user;

display the list of devices to the first user;

accept an input, from the first user, indicating a selection of one or more of the listed devices on which to share the content; and provide the content sharing device management service with the selection, and in the providing the content sharing device management service, the client computing device is configured to, package at least the content to be shared and identification of the selected one or more listed devices into a content sharing package, and transmit the content sharing package to an intermediate server to be transmitted to the selected one or more listed devices to share the content with the second user.

2. The at least one computer-readable storage medium of claim 1, wherein an intermediate server is configured to provide the content sharing device management service, and wherein another set of instructions are configured to cause the intermediate server, in response to execution of the other set of instructions by the intermediate server, to assemble a list of devices associated with the second user, and transmit the list of devices to a computing device of the first user to be displayed to the first user for selection of one or more of the listed devices on which to share the content.

3. The at least one computer-readable storage medium of claim 2, wherein the other set of instructions are configured to cause the intermediate server, in response to execution of the instructions by the intermediate server, to facilitate establishment of a peer-to-peer connection between the first and second user.

4. The at least one computer-readable storage medium of claim 2, wherein the other set of instructions are configured to cause the intermediate server, in response to execution of the instructions by the intermediate server, to receive content to be shared with the second user and a selection of one or more devices from the list of devices associated with the second user, and transmit the content to the one or more devices selected from the list.

5. The at least one computer-readable storage medium of claim 4, wherein the devices associated with the second user include a device designated as a primary device and at least one device designated as a secondary device and wherein to transmit the content to the one or more devices selected from the list further includes transmission of a notification to the primary device indicating the content has been transmitted to the one or more devices selected from the list.

6. The at least one computer-readable storage medium of claim 1, wherein the devices associated with the second user include a device designated as a primary device, and the content sharing device management service is provided by the primary device.

7. The at least one computer-readable storage medium of claim 1, wherein the content sharing device management service is a video-conferencing server, and the content comprises content associated with a video conference between the first and second user, hosted by the video-conferencing server.

8. The at least one computer-readable storage medium of claim 1, wherein another set of instructions are configured to cause a client computing device associated with the second user, in response to execution of the other set of instructions by the client computing device associated with the second user, to:

transmit an identifier of the client computing device to an intermediate server, wherein the intermediate server is configured to provide the content sharing device management service, to assemble into a list, devices associated with the second user; and receive content shared by the first user with the second user when the client computing device is selected by the first user as a device for sharing content with the second user.

9. A computing device comprising:

a communication module including one or more processors configured to transmit and receive data; and a content sharing module, coupled to the communication module, configured to facilitate a first user in selecting at least one of a plurality of devices, associated with a second user, on which to share content with the second user, through a content sharing device management service, and wherein the computing device is a client computing device associated with the first user, and the content share module is further configured to, receive from the content sharing device management service, a list of devices associated with the second user, display the list of devices to the first user, accept input, from the first user, selecting one or more of the listed devices on which to share the content, and provide the content sharing device management service with the selection; and the content share module is further configured to, package at least the content to be shared and identification of the selected one or more listed devices into a content sharing package, and transmit the content sharing package to an intermediate server to be transmitted to the selected one or more listed devices to share the content with the second user.

10. The computing device of claim 9, wherein an intermediate server includes another content sharing module configured to provide the content sharing device management service by being further configured to assemble a list of devices associated with the second user, and transmit the list of devices to a computing device of the first user to be displayed to the first user for selection of one or more of the listed devices on which to share the content.

11. The computing device of claim 10, wherein the devices associated with the second user include a device designated as a primary device, and the content sharing device management service is provided by the primary device.

12. The computing device of claim 10, wherein the other content sharing module is further configured to receive content to be shared with the second user and a selection of one or more devices from the list of devices associated with the second user, and transmit the content to the one or more devices selected from the list.

13. The computing device of claim 12, wherein the devices associated with the second user include a device designated as a primary device and at least one device designated as a secondary device and wherein to transmit the content to the one or more devices selected from the list further includes transmission of a notification to the primary device indicating the content has been transmitted to the one or more devices selected from the list.

14. The computing device of claim 9, wherein the content sharing device management service is provided by a video-conferencing server and the content is associated with a video conference between the first and second user, hosted by the video-conferencing server.

15. The computing device of claim 9, wherein a client computing device associated with the second user includes another content sharing module is configured to transmit an identifier of the client computing device to an intermediate server, to assemble into a list, devices associated with the second user; and receive content shared by the first user with the second user when the client computing device is selected by the first user as a device for sharing the content with the second user.

16. A computer-implemented method comprising:
assembling, by a server, a list of devices associated with the second user; and transmitting, by the server, the list of devices to a computing device of the first user to be displayed to the first user for selection of one or more of the listed devices on which to share content through a content sharing device management service, wherein in response to receiving the list of devices from the server, a computing device associated with the first user accepts an input, from the first user, indicating the selection of the one or more of the listed devices on which to share the content, and provides the content sharing device management service with the selection, and wherein in the providing the content sharing device management service, the computing device associated with the first user packages at least the content to be shared and identification of the selected one or more listed devices into a content sharing package, and transmits the content sharing package to an intermediate server to be transmitted to the selected one or more listed devices to share the content with the second user.

17. The computer-implemented method of claim 16, further comprising:

receiving, by the server, content to be shared with the second user and a selection of one or more devices from the list of devices associated with the second user; and transmitting, by the server, the content to the one or more devices selected from the list.

18. The computer-implemented method of claim 17, wherein the devices associated with the second user include a device designated as a primary device and at least one device designated as a secondary device and wherein transmitting the content to the one or more devices selected from the list further comprises transmitting a notification to the primary device indicating the content has been transmitted to the one or more devices selected from the list.

19. The computer-implemented method of claim 16, wherein the list of devices includes network addresses associated with the devices to be used by the computing device of the first user to establish a peer-to-peer network between the computing device of the first user and the devices associated with the second user.

20. A computer-implemented method comprising:
receiving, by a client computing device associated with the first user, a list of devices associated with a second user from a server, wherein the server assembles the list of devices associated with the second user and transmits the list of devices to the client computing device to be displayed to the first user for selection of one or more of the listed devices on which to share content through a content sharing device management service;

displaying, by the client computing device, the list of devices to the first user;

accepting, by the client computing device, input, from the first user, selecting one or more of the listed devices on which to share the content with the second user; and providing, by the client computing device, the content sharing device management service with the selection, and the providing includes, packaging, by the client computing device, at least the content to be shared and identification of the selected one or more listed devices into a content sharing package; and transmitting, by the client computing device, the content sharing package to an intermediate server to be transmitted to the selected one or more listed devices to share the content with the second user.

* * * * *